United States Patent

Meessmann et al.

[11] Patent Number: 5,781,958
[45] Date of Patent: Jul. 21, 1998

[54] BRUSH HANDLE

[75] Inventors: Jeffrey S. Meessmann; Gerald S. Szczech, both of Iowa City, Iowa; William A. Bredall, Pacifica, Calif.

[73] Assignee: Gillette Canada Inc., Kirkland, Canada

[21] Appl. No.: 601,567

[22] Filed: Feb. 14, 1996

[51] Int. Cl.$^6$ .............. A46B 5/00; A46B 9/04; B25G 1/00
[52] U.S. Cl. .............. 15/167.1; 15/143.1; 16/111 R; 433/141
[58] Field of Search .............. 15/143.1, 167.1; 16/110 R, 111 R, DIG. 12, DIG. 19; 81/489; 433/141

[56] References Cited

U.S. PATENT DOCUMENTS

| | | | |
|---|---|---|---|
| D. 285,263 | 8/1986 | Hill | D4/104 |
| D. 324,775 | 3/1992 | Kreisher et al. | D4/104 |
| D. 328,977 | 9/1992 | Halm | D4/104 |
| D. 334,288 | 3/1993 | Witzig-Jaggi | D4/104 |
| D. 342,160 | 12/1993 | Curtis et al. | D4/104 |
| D. 342,162 | 12/1993 | Curtis et al. | D4/104 |
| D. 351,732 | 10/1994 | Dair et al. | D4/104 |
| 876,317 | 1/1908 | Booth. | |
| 2,125,783 | 8/1938 | Heeman. | |
| 2,179,266 | 11/1939 | Lukenbill | 15/167.1 |
| 4,283,808 | 8/1981 | Beebe | 15/145 |
| 4,416,166 | 11/1983 | Jannard et al. | 74/551.9 |
| 4,712,304 | 12/1987 | Sanelli | 30/343 |
| 4,721,021 | 1/1988 | Kusznir. | |
| 4,739,536 | 4/1988 | Bandera et al. | 16/111 R |
| 4,949,457 | 8/1990 | Burout, III | 30/85 |
| 5,014,383 | 5/1991 | Costar | 15/160 |
| 5,027,511 | 7/1991 | Miller | 30/85 |
| 5,052,071 | 10/1991 | Halm | 15/167.1 |
| 5,054,154 | 10/1991 | Schiffer et al. | 15/167.1 |
| 5,261,665 | 11/1993 | Downey. | |
| 5,305,490 | 4/1994 | Lundgren | 15/167.1 |
| 5,339,482 | 8/1994 | Desimone et al. | 15/167.1 |
| 5,353,464 | 10/1994 | Atkins et al. | 15/167.1 |
| 5,373,602 | 12/1994 | Bang | 15/167.1 |
| 5,390,572 | 2/1995 | Gakhar et al. | 81/436 |
| 5,398,369 | 3/1995 | Heinzelman et al. | 15/143.1 X |
| 5,630,244 | 5/1997 | Chang | 15/143.1 X |

FOREIGN PATENT DOCUMENTS

| | | | |
|---|---|---|---|
| 1257061 | 11/1989 | Canada. | |
| 0429408 | 5/1991 | European Pat. Off.. | |
| 0580406 | 1/1994 | European Pat. Off.. | |
| 611533 | 8/1994 | European Pat. Off.. | |
| 2026552 | 12/1971 | Germany | 16/110 R |
| 3628722 | 2/1988 | Germany. | |
| 4219253 | 12/1993 | Germany. | |
| 4222931 | 12/1993 | Germany. | |
| 4229152 | 3/1994 | Germany. | |
| 396846 | 8/1933 | United Kingdom. | |
| 2216785 | 10/1989 | United Kingdom. | |
| 91/19437 | 12/1991 | WIPO. | |

*Primary Examiner*—Mark Spisich
*Attorney, Agent, or Firm*—Owen J. Meegan; Aubrey C. Brine; Donal B. Tobin

[57] ABSTRACT

A toothbrush has an elongated handle with bristles disposed at one end extending outwardly from one surface of the handle. The handle is formed of a semi-rigid plastic material having a pair of flanges disposed on the surface opposite that of the bristles for controlling the flexure at various points along the handle length and a softer material is formed onto that portion of the handle containing the flanges to provide a soft grip for the user.

16 Claims, 4 Drawing Sheets

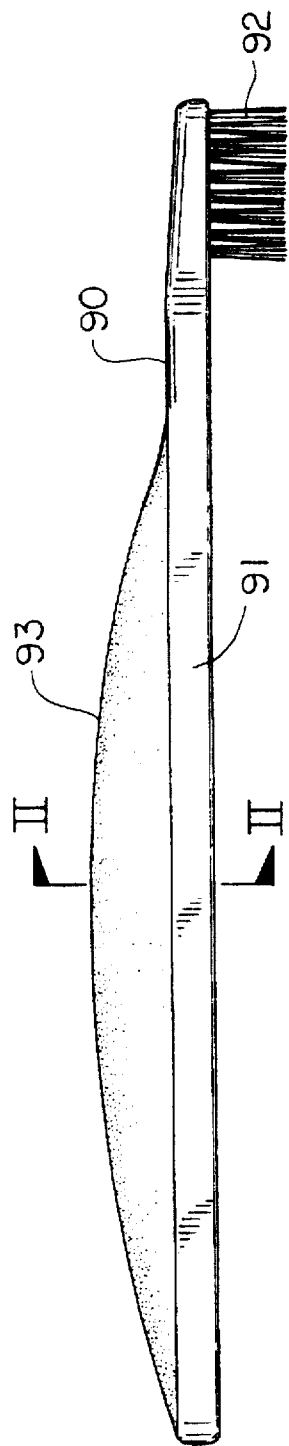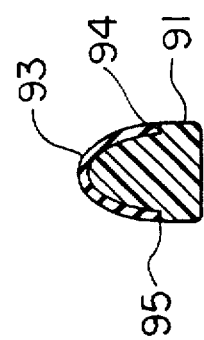
FIG. 1
PRIOR ART
FIG. 2
PRIOR ART

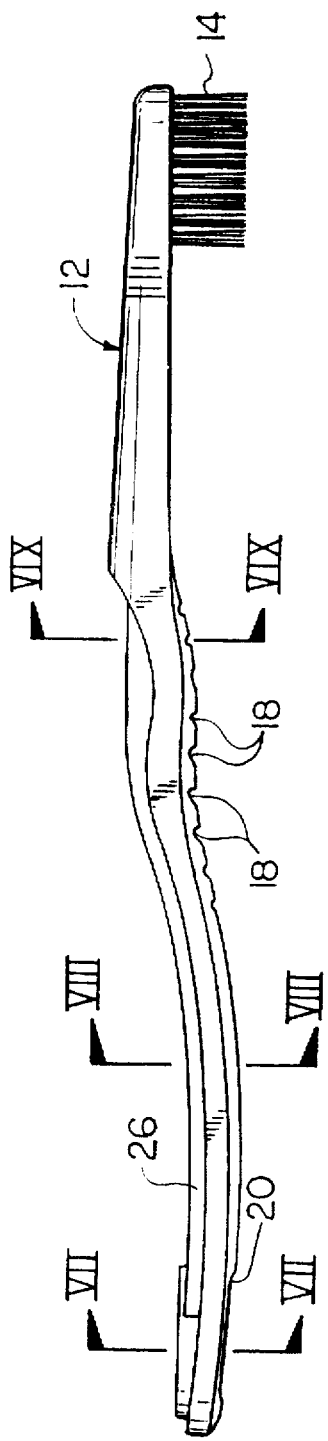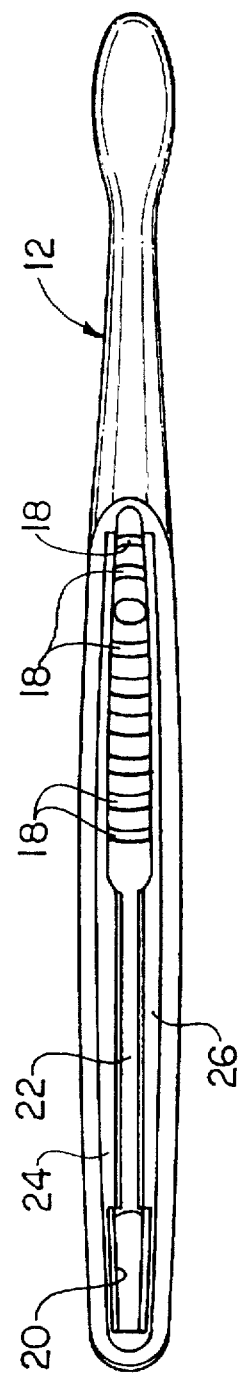
FIG. 5
FIG. 6

BRUSH HANDLE

BACKGROUND OF THE INVENTION

The present invention relates to brush handles and more particularly to a toothbrush handle having a finger-gripping portion which is capable of deformation by the fingers of the user.

Recent toothbrush designs have been marketed which provide various gripping features to the toothbrush handle in an attempt to produce a better "feel" to the user, while maintaining the structural capability of the brush to provide the necessary pressure to the bristle end of the brush. These handle configurations have taken the form of grooves or other formations on the handle of a unitary structure or, in some instances, a two-part handle is provided wherein a thin layer of soft pliable material is provided on the more rigid portion of the handle to achieve the design objective. In many constructions a thin layer of elastic material in the range of 2 mm is formed onto a rigid handle which results in an aesthetically pleasing handle having little or no ergonomic value to the user.

In the two-part construction, wherein a separate soft and more pliable material is applied to a more rigid handle member, it is often necessary to compromise the requirement to provide a quantity of soft material necessary to allow deformation by the fingers of the user while retaining the rigidity of the more rigid handle of the brush without producing a handle having an unusually large thickness. A relatively thick toothbrush handle would in many instances be unacceptable to the user, in particular where a brush is being provided for use by children or those with smaller hands.

It also must be considered in providing the combination of a soft finger-gripping material to the gripping portion of the toothbrush, that a sufficient structure of the rigid material must be maintained to enable the user to apply pressure to the bristle portion of the brush without damage to the handle, over a period of usage. A necessity therefore has risen to provide a two-element brush in which the flexibility over the length of the handle is controlled while maintaining a desirable thickness to the gripping portion about which the hand of the user envelopes.

It is therefore an object of the present invention to provide a handle for a toothbrush or other such appliance which comprises a gripping surface having a finger-deformable portion to present a more desirable "feel" to the user.

A further object of the invention is to provide an article of the type set forth above having a greater thickness of finger-deformable material over the handle length than in devices of the prior art.

Another object of the invention is to provide a toothbrush of the type described which contains a deformable finger-gripping portion while maintaining that rigidity in the handle necessary to apply a desirable pressure to the toothbrush bristles.

Yet another object of the invention is to provide an article such as a toothbrush handle which is simple in design and easily manufactured while maintaining the objectives set forth above.

SUMMARY OF THE INVENTION

The above objects and other objectives which will become apparent as the description proceeds are accomplished by providing a toothbrush comprising an elongated handle having a pair of opposed surfaces with a plurality of bristles extending outwardly from one of the surfaces adjacent one end of the handle. A gripping means is disposed adjacent the opposite end of the handle, the gripping means comprising an elongated cavity formed on the other of the opposed surfaces along a portion of the elongated handle, and at least one and preferably a pair of flanges extend outwardly from adjacent each of the edges of the cavity and into the gripping element to provide a desired rigidity to the elongated handle during the brushing process.

The flanges are generally disposed entirely within the gripping element and the inner surfaces of the flanges may be an extension of the inner surface of the cavity. The flanges also may be inwardly offset from the outer edge of the elongated handle.

A plurality of slotted opening may be provided in the base of the cavity in which construction the gripping element will be formed having portions extending into the slotted openings.

While the invention is disclosed embodied in a toothbrush handle it may be incorporated in an appliance handle of any type comprising an elongated body member having a pressure-applying surface disposed at one end and a gripping portion adjacent the other end thereof. In an appliance structure of this type the body member has an elongated cavity formed therein extending axially along the gripping portion at the opposite-facing surface of the that of the pressure-applying surface. The cavity generally is provided with a pair of flanges extending outwardly therefrom and adjacent each of the elongated edges thereof. A gripping element is formed in the cavity having the pair of flanges extending therein to provide a rigidity to the gripping portion of the brush handle during use of the appliance.

In its broadest aspect the invention may be adapted to any dental appliance or the like having a pressure-applying surface disposed at one end and a gripping portion adjacent the opposite end thereof. The gripping portion generally comprises a layer of soft thermoplastic elastomer having a thickness in the pressure-applying direction of 2 mm to 15 mm and a Shore A hardness value in the range of 5 to 30.

BRIEF DESCRIPTION OF THE DRAWING

Reference is made to the accompanying drawing in which there is shown an illustrative embodiment of the invention from which its novel features and advantages will be apparent, wherein:

FIG. 1 is a side elevational view intended to depict a typical toothbrush of the prior art having a soft gripping portion provided thereon;

FIG. 2 is a sectional view taken along the line II—II of FIG. 1 showing details of the prior art toothbrush of FIG. 1;

FIG. 5 is a side elevational view, similar to FIG. 3, showing a portion of the structure of FIGS. 3 and 4 in detail;

FIG. 6 is a top plan view similar to FIG. 4 showing further details of the portion of the toothbrush shown in FIG. 5;

DESCRIPTION OF THE PREFERRED EMBODIMENT

Figure 3:
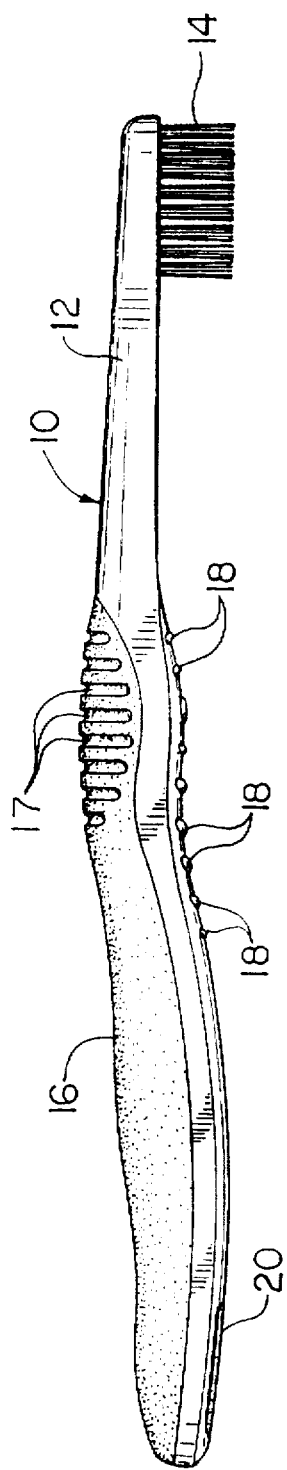
FIG. 3 is a side elevational view of a toothbrush constructed in accordance with the teachings of the present invention, the opposite side view being a mirror image thereof.

Referring now to the drawing and in particular to FIGS. 1 and 2 in which a typical prior art toothbrush 90 is shown to comprise a semi-rigid handle member 91 with the bristles 92 disposed on one surface and a gripping layer 93 disposed on the opposite surface from that of the bristles. The gripping layer 93 may be formed of a number of available materials, the objective being to provide a finger-gripping area which is more pleasing to the user and which prevents slippage of the handle in the user's grip during the brushing operation.

As best shown in FIG. 2, the handle member 91 is provided with a pair of shoulders 94 and 95 to receive and retain the gripping layer 93. As is evident from FIG. 2 the amount of deformable or pliable material in the gripping layer 93 must be sufficient to allow a soft feel by the fingers of the user, while the material which is chosen must also have the wearability necessary for reliability during daily use. In contrast, the handle member 91 must be of sufficient rigidity and strength to provide pressure at the bristles 92, while the deformation of the handle over its length should be controlled during the brushing operation. A handle structure having excessive deformable material would present a large gripping area difficult for manipulation by those with small hands such as children, while a handle which is insufficient in rigid material would lack the rigidity at the proper locations necessary to provide proper brushing pressure. The result generally is a compromise over the optimum desirable for each of these features.

Figure 4:
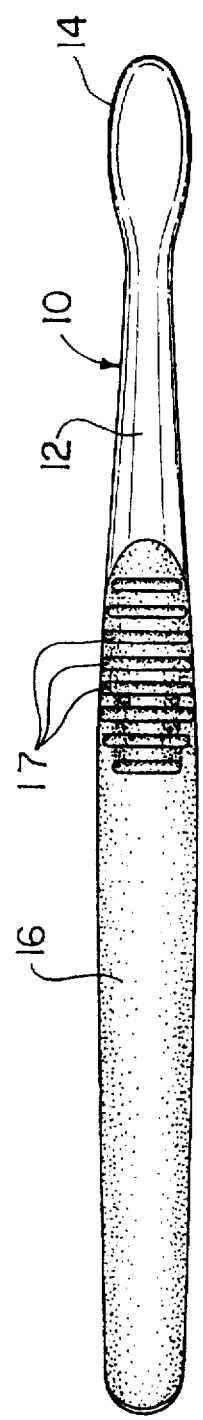
FIG. 4 is a top plan view of the toothbrush of FIG. 3 showing details of the structure.

Referring now to FIGS. 3 and 4, the present invention provides a toothbrush 10 having an elongated handle member 12 comprising bristles 14 extending from the lower surface thereof. A gripping means in the form of a gripping element 16 is formed on the opposite surface from that of the bristles, the gripping element having a plurality of grooves 17 formed on its surface to enhance the gripping quality of the element. The handle member 12 is generally manufactured of a thermoplastic material, such as polypropylene, which in the present structure has a Shore R hardness value in the area of 97 to 100. The gripping element 16 is formed by an injection molding process onto the handle member 12, and in the present embodiment is a thermoplastic elastomer material which may have a hardness value in the area of 5 to 30, and preferably in the area of 20, measured on the Shore A scale, the hardness value being chosen to give a soft flexible feeling under finger pressure. While a chemical bond exists between the gripping element 16 and the handle member 12, a plurality of slotted openings 18 are provided in that surface of the handle member 12 from which the bristles 14 extend, and in the injection molding process the material of the gripping element 16 flows through the openings to better retain the gripping element onto the handle member as well as to provide additional gripping surfaces for the user's fingers. An elongated opening 20 is provided at the opposite end of the handle member 12 from that of the bristles 14 and, as with the slotted openings 18, the material from the gripping element 16 is injected into the slotted opening 20 and aids in retaining that portion of the gripping element 16 onto the handle member 12.

Referring now to FIGS. 5 through 9, the handle member 12 is shown to be provided with a cavity 22 extending from adjacent the end of the handle member opposite the bristle location to a point past the mid-length of the handle member. The cavity 22 has a pair of upwardly extending flanges 24 and 26 formed on either side thereof, the inner surface of each flange being an extension of the inner surface of the cavity 22. The flanges 24 and 26 are offset inwardly from the outer surfaces of the handle member 12 and by forming the outer surface of the gripping element 16 as an extension of the outer side surfaces of the handle member 12 the flanges 24 and 26 are completely contained within the gripping element 16.

Figure 9:
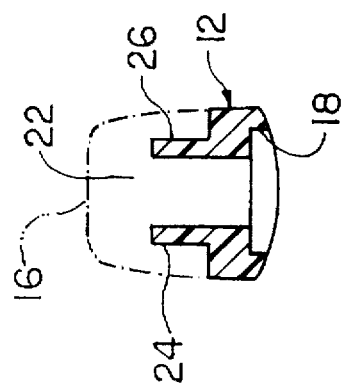
FIG. 9 is a right sectional view taken along the line IX—IX of FIG. 5 showing details of that area of the toothbrush portion depicted in FIGS. 5 through 8.
Figure 8:
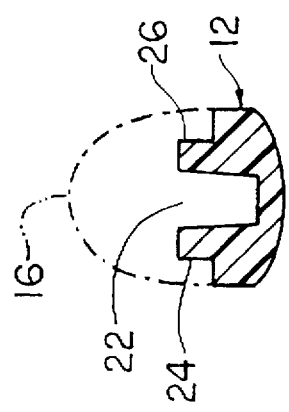
FIG. 8 is a right sectional view taken along the line VIII—VIII of FIG. 5 showing additional details of the structure.
Figure 7:
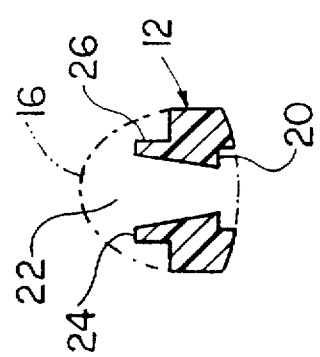
FIG. 7 is a right sectional view taken along the line VII—VII of FIG. 5 showing details of the cavity formed in that portion of the toothbrush structure.

As will be evident from viewing FIGS. 7 through 9, both the size of the toothbrush handle in its entirety, the handle member, and gripping element, may be formed in keeping with the objectives of the invention. The need for a handle size which is easy to manipulate, the desirability of a quantity of soft flexible material to provide a soft gripping element 16 and the varying rigidity over the length of the handle member 12, are easily controlled by increasing or decreasing the height of the flanges 24 and 26, generally maintaining a height of 2 mm to 15 mm of soft material in the gripping element. Furthermore, this combination may be accomplished at any point along the length of the toothbrush or appliance to create a particular rigidity and softness at any point along the length of the brush handle while maintaining a brush having a desirable feel and appearance.

Thus, in either FIGS. 7, 8 or 9, should a more rigid section be required, the flanges 24, 26 may be increased in height. Should more flexibility be required the flanges may be decreased in height. The amount of material in the gripping element 16 may be increased or decreased to produce the proper feel as the more rigid handle member is proportionately increased or decreased to maintain a required overall thickness, the overall desired rigidity at any point being attained by increase or decrease of the flanges 24, 26.

While it is apparent that changes and modifications can be made within the spirit and scope of the present invention, it is my intention, however, only to be limited by the appended claims.

As our invention we claim:

1. A toothbrush comprising:
   an elongated handle having a pair of opposed surfaces with a plurality of bristles extending outwardly therefrom at one end of said handle;
   a gripping means disposed adjacent the opposite end of said handle;
   said gripping means comprising an elongated cavity formed in one of said opposed surfaces along a portion of said elongated handle;
   a gripping element formed in said cavity, extending outwardly therefrom; and
   at least one flange extending outwardly from said cavity and into said gripping element to provide rigidity to said elongated handle during the brushing process.

2. A toothbrush as set forth in claim 1 wherein said flanges are two in number.

3. A toothbrush as set forth in claim 2 wherein said flanges are disposed entirely within said gripping element.

4. A toothbrush as set forth in claim 2 wherein each of said flanges is an extension of an inner surface of said cavity.

5. A toothbrush as set forth in claim 2 wherein each of said flanges is inwardly offset from an adjacent outer surface of said elongated handle.

6. A toothbrush as set forth in claim 1 wherein a plurality of slotted openings are provided in said cavity and said gripping element is formed having portions extending into said slotted openings.

7. A toothbrush as set forth in claim 1 wherein said gripping element is manufactured of a thermoplastic elastomer material.

8. A toothbrush as set forth in claim 7 wherein said thermoplastic elastomer material is of a hardness in the area of 5 to 30 measured on the Shore A scale.

9. A toothbrush as set forth in claim 1 wherein said handle is manufactured of a thermoplastic material.

10. A toothbrush handle as set forth in claim 9 wherein said thermoplastic material has a Shore R hardness in the area of 97 to 100.

11. A toothbrush as set forth in claim 3 wherein each of said flanges is inwardly offset from an adjacent outer surface of said elongated handle.

12. A toothbrush as set forth in claim 11 wherein said gripping element is manufactured of a thermoplastic elastomer material of a hardness in the area of 5 to 30 measured on the Shore A scale.

13. A toothbrush as set forth in claim 12 wherein said handle is manufactured of a thermoplastic material.

14. A toothbrush handle as set forth in claim 13 wherein said thermoplastic material of said handle has a Shore R hardness in the area of 97 to 100.

15. A toothbrush as set forth in claim 1 wherein said bristles extend outwardly from one of said pair of opposed surfaces.

16. A toothbrush as set forth in claim 15 wherein said bristles extend outwardly from said opposed surface opposite the opposed surface in which said elongated cavity is formed.

* * * * *